(12) United States Patent
Moubedi

(10) Patent No.: US 11,973,362 B2
(45) Date of Patent: Apr. 30, 2024

(54) CHARGE CABLE DEADZONE MITIGATION

(71) Applicant: Snap Inc., Santa Monica, CA (US)

(72) Inventor: Shaheen Moubedi, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 377 days.

(21) Appl. No.: 17/377,113

(22) Filed: Jul. 15, 2021

(65) Prior Publication Data

US 2021/0344207 A1 Nov. 4, 2021

Related U.S. Application Data

(63) Continuation of application No. 16/704,793, filed on Dec. 5, 2019, now Pat. No. 11,070,070.

(60) Provisional application No. 62/785,489, filed on Dec. 27, 2018.

(51) Int. Cl.
*H02J 7/00* (2006.01)
(52) U.S. Cl.
CPC .......... *H02J 7/0045* (2013.01); *H02J 7/0036* (2013.01); *H02J 7/00716* (2020.01); *H02J 2207/30* (2020.01)

(58) Field of Classification Search
None
See application file for complete search history.

(56) References Cited

U.S. PATENT DOCUMENTS

| 11,070,070 | B2 | 7/2021 | Moubedi | |
|---|---|---|---|---|
| 2010/0207771 | A1* | 8/2010 | Trigiani | H02J 50/80 320/108 |
| 2012/0299715 | A1* | 11/2012 | Ichikawa | H02J 7/02 340/455 |
| 2020/0189416 | A1* | 6/2020 | Jung | G06F 8/65 |

FOREIGN PATENT DOCUMENTS

| JP | H0736380 U | 7/1995 |
|---|---|---|
| WO | 2009017783 A1 | 2/2009 |

OTHER PUBLICATIONS

International Search Report and Written Opinion for International Application No. PCT/US2019/064730, dated Feb. 13, 2020 (Feb. 13, 2020)—11 pages.

* cited by examiner

*Primary Examiner* — Arun C Williams
(74) *Attorney, Agent, or Firm* — Culhane Meadows PLLC; Stephen J. Weed

(57) ABSTRACT

A charging cable is configured to rotate freely while attached to a cable plug on a chargeable device. The plug has contact pads separated by an insulator, and the matching cable head has pins for contacting the pads of the plug. There may be a 'deadzone' position where one or more pins of the cable head rest of the separator and do not make contact with the charge pads on the cable plug. The examples include pins in the cable head for redundant charging paths that are complimentary such that only one of the power paths will be on at any given time.

17 Claims, 9 Drawing Sheets

Timing t_FET t_FET > t_Low
t_FET > t_Resume_Pluse
t_FET > t_Resume_Chg t_FET > max{ t_Low, t_Resume_Pulse, t_Resume_Chg }

Assumption: t_Resume_Pulse >> t_Resume_Chg >> t_Low
t_FET > t_Resume_Pulse

CHARGE CABLE DEADZONE MITIGATION

CROSS-REFERENCE TO RELATED APPLICATIONS

This application is a Continuation of U.S. application Ser. No. 16/704,793 filed Dec. 5, 2019, which claims priority to U.S. Provisional Application Ser. No. 62/785,489, filed on Dec. 27, 2018, the contents of both of which are incorporated fully herein by reference.

TECHNICAL FIELD

The present subject matter relates to a charge cable designed to be rotatable while attached to a device to be charged and to techniques to mitigate any deadzone effect due to possible landing of contact pins of the cable head on an insulator between charge pads of a cable plug on the chargeable device.

BACKGROUND

Many types of electronic devices, such as portable or wearable devices, have integrated electronics requiring an onboard power supply in the form of a battery. From time to time, such a device is coupled to a source of power to charge the battery. This approach to charging for electronic devices often uses a charging cable connected to a suitable receiver on the electronic device.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

Figure 1:
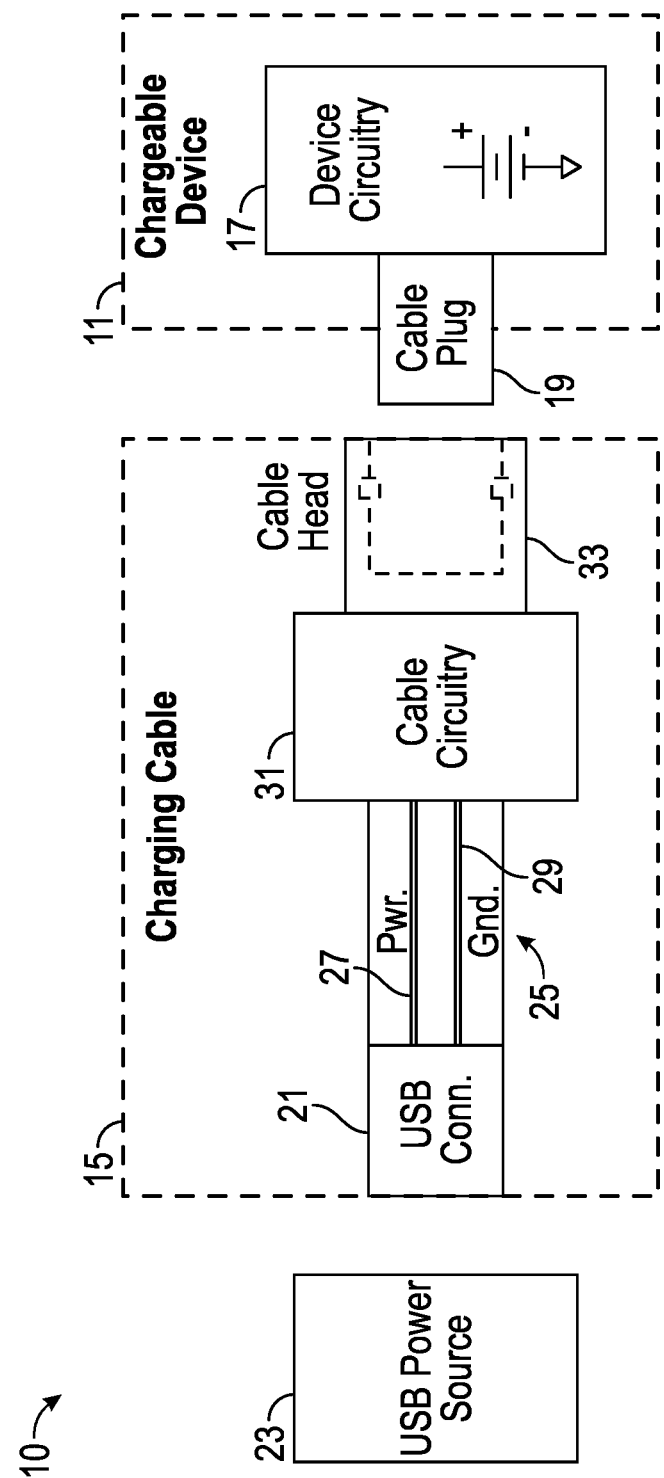
FIG. 1 is a high-level block diagram of an example combination or system, including a charging cable and a chargeable device, with a cable head and a cable plug on the device that are configured for rotatable coupling.

In the following detailed description, numerous specific details are set forth by way of examples in order to provide a thorough understanding of the relevant teachings. However, it should be apparent to those skilled in the art that the present teachings may be practiced without such details.

The descriptions of the examples that follow are intended to be read in connection with the accompanying drawings, which are to be considered part of the entire written description. In the description, relative terms such as "right," "left," "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "coupled," "connected" and "interconnected," refer to a relationship wherein structures are secured or attached to one another either directly or indirectly through intervening structures, as well as both removable or rigid attachments or relationships, unless expressly described otherwise.

The various examples disclosed herein relate to a cable used in the charging of a battery powered electronic device, where the cable head rotatably connects the cable to a compatible plug on the electronic device, and to circuitry of the cable and possibly in the chargeable device to mitigate any potential deadzone effect.

A charging cable may be designed to rotate freely while attached to a downstream chargeable device. In examples described below, the cable includes power and ground buses and a cable head with a socket recess and inwardly protruding pins coupled to the buses for electrical connection to the battery powered device intended to be charged. The chargeable device has a cable plug for insertion into the socket recess of the cable head when the cable is coupled to the chargeable device.

The cable plug includes two charging contact pads of a suitable conductive material (e.g., rigid, durable, conductive metal) separated by an insulator, such as a suitable plastic. In the examples, surfaces of the charging contact pads are exposed for potential pin contact, at different locations around an approximately cylindrical surface of the cable plug, e.g., mounted and exposed on opposite sides of the cylindrical surface with areas of the separator isolating ends or edges of the exposed surfaces of the charging contact pads from each other and thereby forming a potential deadzone.

With such a cable head and cable plug configuration, the charging cable (including the head) is freely rotatable relative to the plug of the chargeable battery powered device. There may be a certain position, however, where the cable's charge pins of the head will not make contact with the charge pads on the cable plug of the device because the pins are resting on the plastic separator. In this deadzone position, there is no electrical connection and the charge cable cannot supply power to the device until the user rotates the cable. This may force the user, for example, to wiggle the cable head out of the deadzone in order to activate or resume charging. The likelihood or probability of the pins landing on the deadzone may depend on the mechanical width of the plastic separator, tolerance, wear and tear on the receiver or cable head, and user behavior.

The examples below introduce a second power path by providing redundant power and ground pins on the head of the charge cable. In the specific examples, the two separate power paths are complimentary such that only one of the power paths will be on at any given time. When the cable enters a position where one of its power paths is resting on the "deadzone", logic circuitry of the cable controls one or more switches so as to change the charging current over to the second power path which will be capable of providing power to the device.

Various forms of detection may be utilized, e.g., to detect coupling of the head to the cable plug in the receiver and to detect which pins are properly contacting the charging contact pads of the cable plug at any given time, to enable control of switching to activate current flow through the pins of the cable head having the proper contacts with the contact pads of the cable plug on the chargeable device. Device presence can be detected in a number of ways, e.g., using a proximity sensor. Rather than adding extra sensor pins or extra contact pads for connection sensing, however, the examples, rely on sensing of current flow through a circuit formed through the cable head and the cable plug. Various current detection techniques may be utilized. For example, logic of the charging cable may alternate connections to pairs of pins so as to toggle between two power paths using two sets of power and ground pins in the cable head, while sensed current is low. When current sensing goes high one on of the paths, the logic controls the one or more switches so as to selectively maintain that path and stop toggling.

Reference now is made in detail to the examples illustrated in the accompanying drawings and discussed below. FIG. 1 illustrates an example of the overall combination of elements forming a system 10. As shown, the system 10 includes a chargeable device 11 and a charging cable 15. The chargeable device 11 includes device circuitry 17 that, as shown in later FIG. 4, includes a battery and a battery charger circuit coupled to the battery. The chargeable device 11 also includes a cable plug 19 that includes first and second charging contact pads coupled to supply power to the battery charger circuit. An insulator electrically separates the contact pads. In examples shown in FIG. 2 or FIG. 8, the charging pads include a power contact pad coupled to the battery charger circuit, a ground contact pad coupled to the ground of the chargeable device, and an insulator between the power contact pad and the ground contact pad. It should be apparent, however, that the contacts or contact pads of the plug need not strictly be power or ground; and either pad may serve the alternate function. For convenience only, further discussion of the non-limiting examples will sometimes refer to a specific contact or pad as a power contact pad and the other contact or pad as a ground contact pad.

The charging cable 15 includes a connection to power. Although other types of connectors and associated power sources may be used, the power connector in the example is a male USB type connector 21. Although not necessarily a part of the system 10, the drawing also shows a compatible power source that, in an example using USB connector 21, would be a USB power source 23. Examples of a USB power source 23 include a computer, a wall adapter or a car charger, with a female USB port configured to receive the male USB connector 21 of the charging cable 15.

The charging cable 15 in the example includes an insulated wire bundle 25, which includes a power bus 27 and a ground bus 29. Other wires or buses may be included for other purposes. In the example, the wire bundle connects the USB connector 21 to cable circuitry 31 which connects to a cable head 33. The illustrated arrangement, however, is a non-limiting example, and other arrangements of the cable elements may be used. In an alternative configuration, there may be an additional wire bundle between the cable circuitry 31 and cable head 33; or in another alternative configuration, the cable circuitry 31 may be connected to or integrated with the USB connector 21 (with power and ground buses internal to the circuitry 31 or the connector 21) and a somewhat different cable bundle would connect the circuitry 31 to the cable head 33.

At a high level, the cable head 33 has a recess configured to accept the cable plug 19 when the head 33 of cable 15 is rotatably coupled the cable plug 19 of the chargeable device 11. A more detailed discussion of the cable plug 19 and the cable head 33 follow, with reference to FIGS. 2 and 3. An example of the cable circuitry is discussed later with respect to FIGS. 7 to 9.

Figure 2:
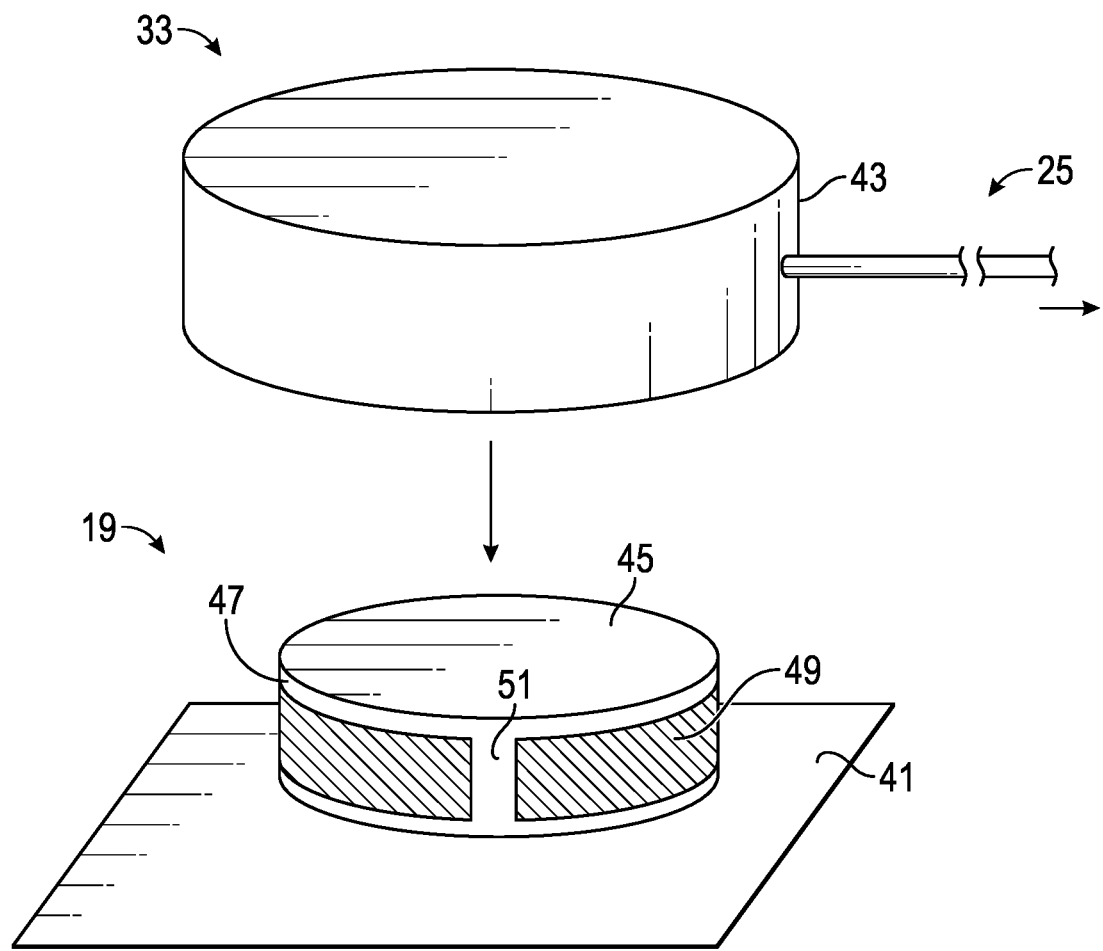
FIG. 2 is an isometric view of examples of a socket for the head of the charging cable and the cable plug on the charging device.

Referring now to FIG. 2, the cable plug 19 is shown as a cylindrical post extending from a wall 41 of a housing or the like of the chargeable device. Although other shapes may be used, a fairly round cylindrical shape is particularly effective at enabling rotation of a cable head having an appropriately shaped mating socket recess. The drawing shows an example of the cable head 33 in the form of a cylindrical socket 43 connected laterally to the end of the wire bundle 25. For convenience, the cable circuitry is omitted from the illustration in FIG. 2. In the illustrated example, the cable plug 19 is exposed on an exterior surface of the housing of the chargeable device, and there are no nearby obstructions that might impact or interfere with rotation of the cable around the cable plug 19 while the plug 19 and cable head 33 are coupled together for device charging.

Although not shown, the cable plug 19 may be recessed as part of a receiver in the device, and the other elements of the cable (e.g., wire bundle 25 or circuitry 31 of FIG. 1) may connect axially to the end of the cable head socket 43 (e.g., to the top side in the illustrated orientation) opposite the socket recess intended for receiving the cable plug 19. In such an arrangement, the charging receiver on the device would include a cylindrical recess somewhat larger than the outer lateral perimeter of the cylindrical socket 43, and the cable plug 19 would be located approximately at the center of that recess. If the chargeable device does not have such a receiver with a cylindrical recess, however, the outer shape of the socket 43 need not be cylindrical and may have some other design or shape, for example, to facilitate a user's grasp of the cable head socket 43 to couple the socket to the cable plug 19 or to turn the socket 43 about the axis of the cable plug 19.

Figure 3:
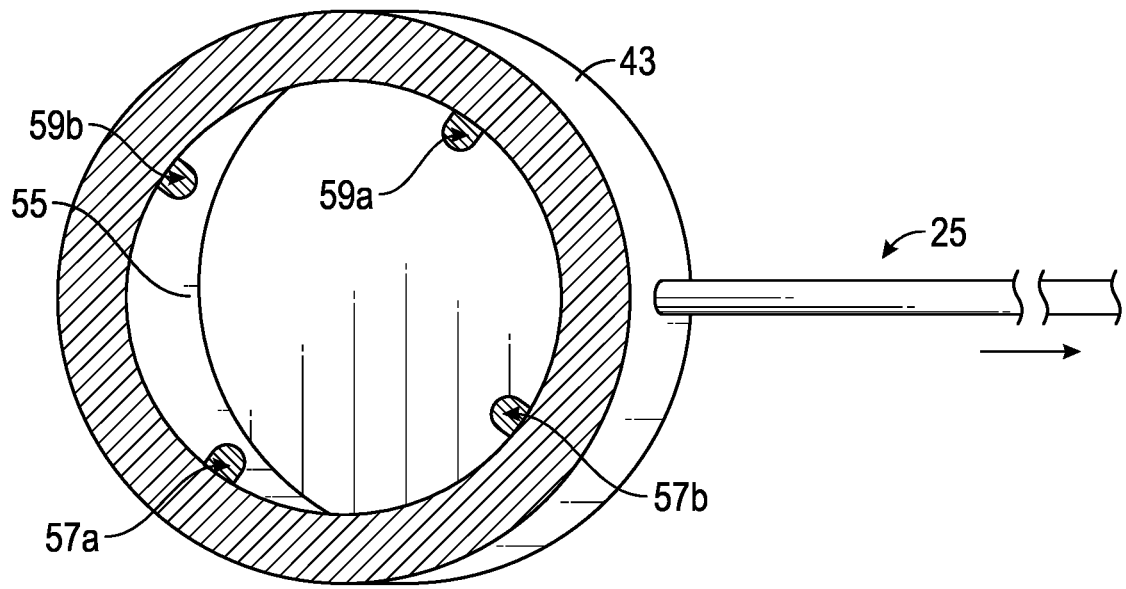
FIG. 3 is an enlarged view of the cable head included in FIG. 2, showing the socket recess for receiving the cable plug of the chargeable device and showing the power (Pwr.) and ground (Gnd.) pins for contacting the pads of the cable plug on the chargeable device.

The cable plug 19 is configured for insertion into a cylindrical recess of the socket 43 of the cable head 33, discussed more with regard to FIG. 3. The cable plug 19 includes two charging contact pads of a suitable conductive material (e.g., metal) separated by an insulator, such as a suitable plastic. Various configurations of the pads and separator may be used. In a later example (FIG. 8), appropriately contoured metal pieces form large sections of the plug and serve as the contact pads; and the electrically insulating separator between the metal pieces completes the cylinder of the plug.

The example in FIG. 2, however, utilizes a post 45 made of plastic or another insulating material. The post 45 is generally cylindrical in shape. Each of the contact pads 47 and 49 is formed of a suitable conductive material, such as a metal. At least some surface area of each of the contact pads 47, 49 is exposed for possible electrical contact by one or more of the pins of the socket 43 of the cable head 33. As shown in FIG. 2, the contact pads 47, 49 are located to present exposed contact surfaces at different locations around the cylindrical lateral surface of the post 45 of the cable plug 19. In the illustrated orientation, the first (1) charging contact pad 47 is mounted on the left side of the cylindrical lateral surface of the post 45, and the second (2) charging contact pad 49 is mounted on the opposite (right) side of the cylindrical lateral surface of the post 45.

The metal forming the contact pads may be deposited on the cylindrical lateral surface of the post 45, in which case, the contact pads 47, 49 may be slightly raised or extended outward from the cylindrical lateral surface of the post 45. Alternatively, the metal forming the contact pads 47, 49 may be embedded in the material of the post 45 and have a thickness so as to form a smooth cylindrical lateral surface of the plug 19. In another alternative example, the metal forming one or both of the contact pads 47, 49 may be embedded sufficiently to form one or more slight indentations in the cylindrical lateral surface of the plug 19. In any of these configurations, however, surfaces of the pads 47, 49 are exposed for mechanical and electrical contact with pins in the cable head socket 43.

In the example of FIG. 2, the insulting material of the post 45 provides structural support for the contact pads 47, 49 and forms the separator between the contact pads to electrically insulate or isolate the contact pads 47, 49 from each other. The insulating material separates the metal or the like of the contact pads on the opposite sides of the structure of the plug (e.g., laterally across the vertical axis of the post 45 in the illustrated orientation). The example plug configuration has exposed sections on the cylindrical lateral surface of the insulting material of the post 45, located in-between adjacent ends of the exposed surfaces of the contact pads 47, 49. One of the exposed sections 51 on the cylindrical surface of the post 45 that is in-between ends of the contact pads 47, 49 is visible in the illustrated orientation. A second similar section is located on an opposite (back) side of the cylindrical post 45 and is not visible in the drawing. Such regions of the plastic post like 51 separating the ends or edges of the surfaces of the contact pads 47, 49 form a deadzone where pins of the socket 43 may be unable to complete a circuit due to failure to contact a pad of the cable plug 19.

Each of the exposed insulating regions 51, however, can be relatively small so as to minimize the size of the deadzone. For example, the region 51 may only be large enough to avoid electrical current flow across the region from an end of one contact pad to the adjacent end of the other contact pad. In another example, the region 51 may be slightly wider than the width of the pins (or the width of largest of the pins) of the cable head 33 so that a pin in the cable head cannot concurrently contact both contact pads 47, 49.

FIG. 3 is an enlarged isometric view of the socket 43 of the cable head. From the illustrated perspective, the drawing shows that the socket 43 has a cylindrical recess 55 for receiving the cable plug of the chargeable device. Although other shapes may be used, the illustrated example has a cylindrical socket recess 55 slightly larger than the lateral cylindrical surface of the cable plug, to facilitate free rotation of the cable head socket 43 relative to the plug, when the plug is inserted into/received in the socket recess 55.

FIG. 3 also illustrates the power (Pwr.) and ground (Gnd.) pins of the cable head for contacting the pads of the cable plug on the chargeable device. As shown, the socket 43 includes two power pins 57a and 57b and two ground pins 59a and 59b. In the example, the pins are located at four equidistant locations around the cylindrical inner wall of the socket recess 55. The power pins 57a, 57b protrude into the sock recess 55 of the cable head; and the ground pins protrude into the socket recess 55 of the cable head. The pins protrude sufficiently to allow contact with the pads of the cable plug. Although not show, the pins may be spring-loaded in the socket or deformable, to provide lateral force against the surface(s) on the plug, including surfaces of the contact pad, with the plug is received in the socket recess.

The power pin 57a and the ground pin 59a provide one charging current path when those pins contact the contact pads 47, 49 of the cable plug 19 of FIG. 2. Similarly, the power pin 57b and the ground pin 59b provide another charging current path when those pins contact the contact pads 47, 49 of the cable plug 19. With the example arrangement of pads as in FIG. 2 and the pins as shown in FIG. 3, at a rotational position of the socket 43 relative to the cable plug 19 in which the pins 57b, 59b contact the regions 51 forming the deadzone, the pair of pins 57a, 59a will contact the contact pads 47, 49 of the cable plug 19. In another rotational position of the socket 43 relative to the cable plug 19 in which the pins 57a, 59a contact the regions 51 forming the deadzone, the other pair of pins 57b, 59b will contact the contact pads 47, 49 of the cable plug 19.

In other positions, the pin pairs 57a, 59a and 57b, 59b will concurrently contact the pads 47, 49 of the cable plug 19. When both pairs of pins contact the pads, one pair will have the correct polarity, e.g., power pin in contact with a contact pad for power on the cable plug and ground pin in contact with a contact pad for ground on the cable plug. The example arrangements of FIGS. 2 and 3 offer a high percentage chance that an appropriate polarity connection will exist with the contact pads of the cable plug, via one of the pin pairs of the socket 43 of the cable head 19. An appropriate polarity pair of pins will contact the pads for those rotational positions in which both pin pairs concurrently contact the pads of the cable plug. For each pin pair to contact the deadzone, there are two rotational positions 180 degrees apart in which the respective pin pair will contact the deadzone. In both such positions, the other pin pair contacts the contact pads of the cable plug; and in one of those deadzone positions, the other pin pair has the appropriate polarity alignment for charging current flow. Only in one deadzone position per pair, will the other pin pair have the wrong polarity contact so as to prevent charging current flow. Hence, in only one rotational position per pin pair, will the deadzone and the polarity mismatch prevent charging. However, in such rare instances, a small rotation will move the pins off the deadzone, both pairs will contact the contact pads of the cable plug, and one of the pairs will have the appropriate polarity to allow current flow.

To take advantage of the redundant charging current paths through the pairs of pins in the cable head and avoid polarity mismatch, the cable includes one or more power path switches to selectively connect a different one of the power pins to the power bus and to selectively connect a different one of the ground pins to the ground bus, in different respective states. A current sensor is coupled to at least one of the buses to detect current via selected pairs of the pins of the cable head. Switching logic circuitry in the cable is configured to control the one or more power path switches to establish a charging connection via a selected pin pair (coupling a selected one of the power pins to the power bus and coupling a selected one of the ground pins to the ground bus). In response to detection of current flow via the selected power and ground pins by the current sensor, the logic maintains the switch connection of the pins to the buses through which current flow was detected. An example of such an approach also detects a pulse modulation of the current by the circuitry of the chargeable device. That specific example is described with regards to drawings starting with FIG. 4.

Figure 4:
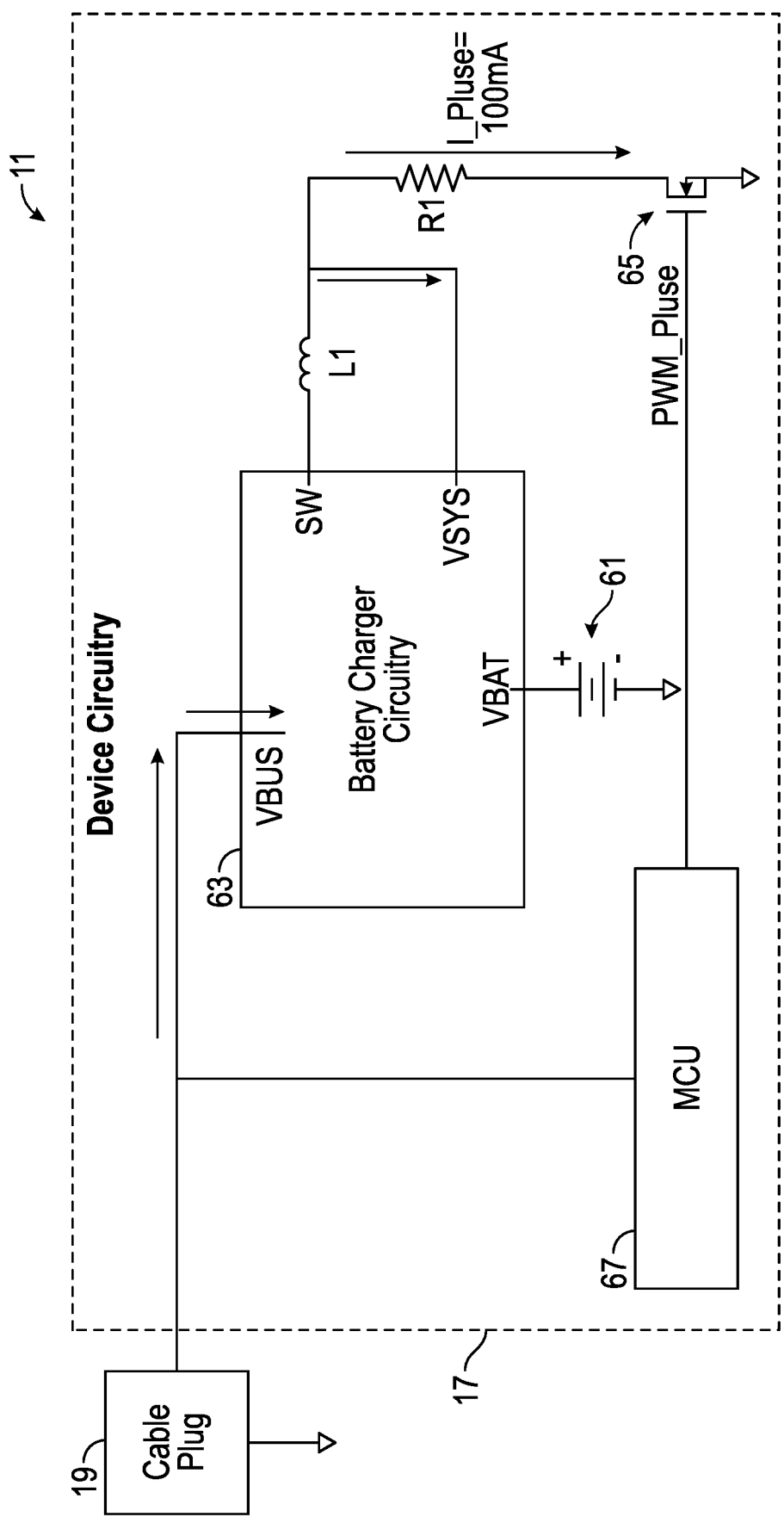
FIG. 4 is a functional block diagram of an example of the battery powered chargeable device.
Figure 8:
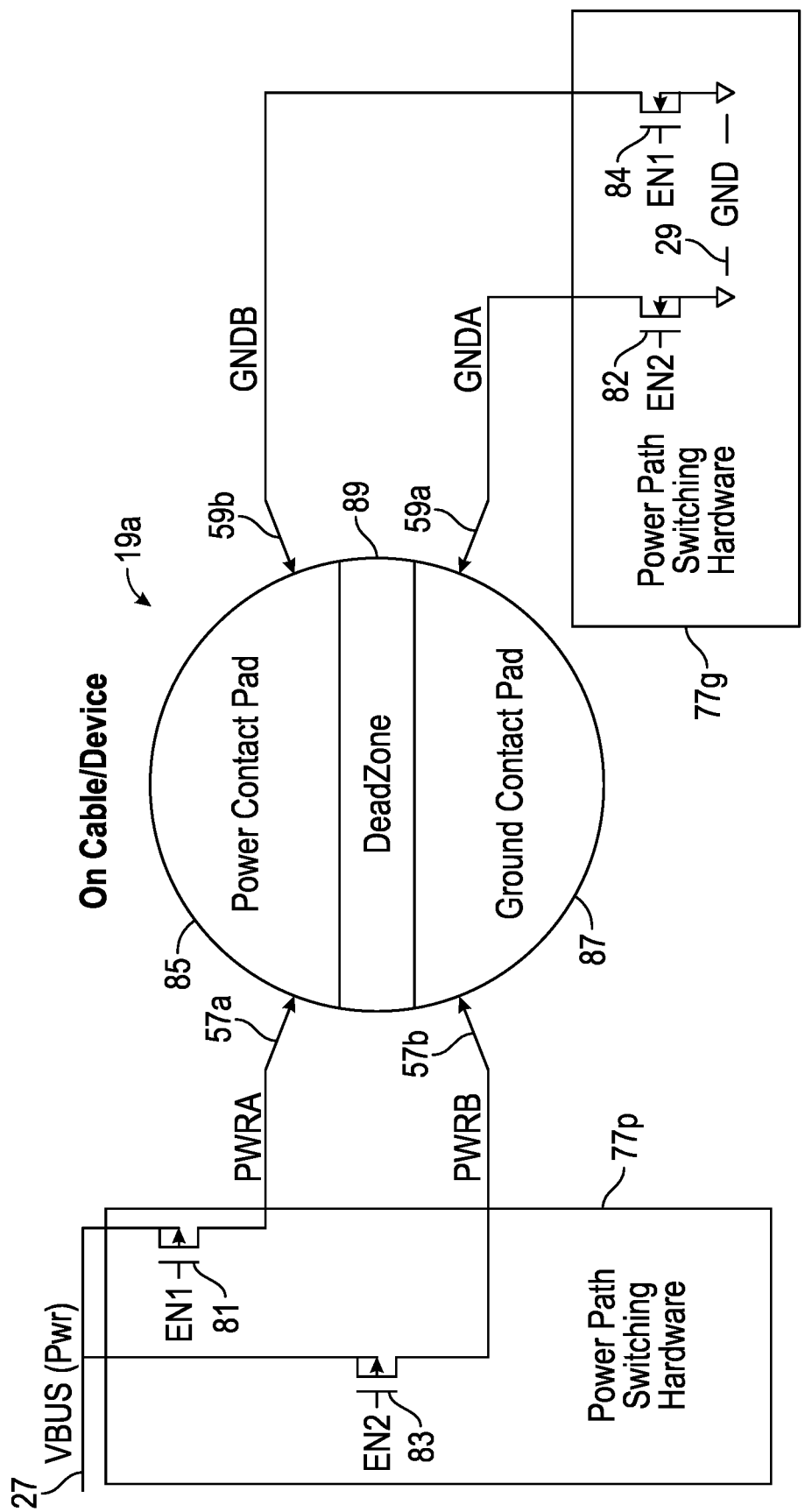
FIG. 8 illustrates elements of the examples of the cable plug, the pins of the cable head and associated switches for selective connection of pairs of pins to power and ground forming the interface between the cable and the chargeable device.

FIG. 4 is a functional block diagram of an example of elements of the battery powered chargeable device 11, which as in FIG. 1, includes device circuitry 17 and a cable plug 19. The cable plug 19 in this device example may be implemented as discussed above relative to FIGS. 2 and 3 or implemented as described later relative to FIG. 8. The chargeable device 11 includes a cable plug 19 that includes a pair of charging contact pads, e.g., as shown in FIG. 2 or FIG. 8 by way of example as a power contact pad and a ground contact pad. The power contact pad is coupled to supply power to the battery charger circuitry 63 at the VBUS port.

The device circuitry 17 includes a battery 61 and the battery charger circuitry 63 coupled to the battery 61. The positive terminal of the battery 61 connects to the battery charger circuitry 63, and the negative terminal of the battery 61 connects to the ground of the chargeable device 11. Device electronics if any that may draw power from the battery 61 for general functions of the device (other than the charging functions under consideration herein) are omitted for convenience. The charging cable and charging technologies discussed here, may apply to any of a wide variety of portable or wearable devices that utilize rechargeable batteries to power the particular electronic components or act as a battery pack to supply charge to other equipment.

The device circuitry 17 includes a switch 65 coupled to draw current from the battery charger circuitry 63. A variety of known circuits may be used to implement the battery charger, for example, based on the type and size of the battery 61. The switch 65 is controlled to cause the particular type of battery charger circuitry 63 to add pulse modulation to the current flow through the charging path formed by the cable plug 19 and the cable head 33. Any switching device configured to switch a suitable amount of current may be used, such as any of a variety of switching transistors. The drawing for example, shows a field effect transistor (FET) as the switch 65. A variety of switch connections to the battery charger 63 and possibly a variety of intervening or associated circuit elements may be utilized. In the example, the switch 65 connects to a switch (SW) port of the battery charger circuitry 63 via a series connection of a resistor R1 and an inductor L1. A path is also provided from the junction between the inductor L1 and the resistor R1 to a system voltage port (VSYS) of the battery charger circuitry 63. The switch 65 in the example is series connected from the resistor R1 to the ground of the chargeable device.

When the switch 65 is in its open state, the battery charger circuitry 63 draws current to charge the battery 61. When the switch 65 is in its closed state, current flow through the switch 65 to ground causes the battery charger circuitry 63 to draw an additional amount of current through the charging path formed by the cable plug 19 and the cable head 33. As discussed more later, switching back and forth between the open and closed states of the switch 65 produces pulses and causes the battery charger circuitry 63 to superimpose corresponding pulses on the flow of current through the charging path formed by the cable plug 19 and the cable head 33. The resulting pulses are detectable by the cable circuitry.

The device circuitry 17 also includes a device controller. Although other controller implementations may be used, the example device utilizes a micro-control unit (MCU) 67. An MCU typically is a system on a chip (Soc) including a processor, memory, peripheral input/output (I/O) interfaces and ports, and possibly other circuit components. For example, a single SoC might incorporate the battery charger circuitry as well as circuitry forming the MCU. For purposes of the present discussion, the MCU 67 controls functions related to charging of the battery, although the MCU may perform other functions relative to the device 11 depending on the device type or applications for the particular electronic device 11. It should be apparent, however, that other controller implementations may be used. Functions of the MCU 67 are determined by executable program instructions or configuration data installed in the memory of the MCU, e.g., as firmware.

In the example chargeable device 11, the MCU 67 forming the device controller is responsive to power from the cable plug 19 and configured to operate the switch 65 to cause the charger circuitry 63 to pulse modulate current through the cable plug 19 as an indication of contact of pins in the cable head with the power and ground contact pads of the cable plug 19 to circuitry 31 of the charging cable 15 (see FIG. 1).

Figure 5:
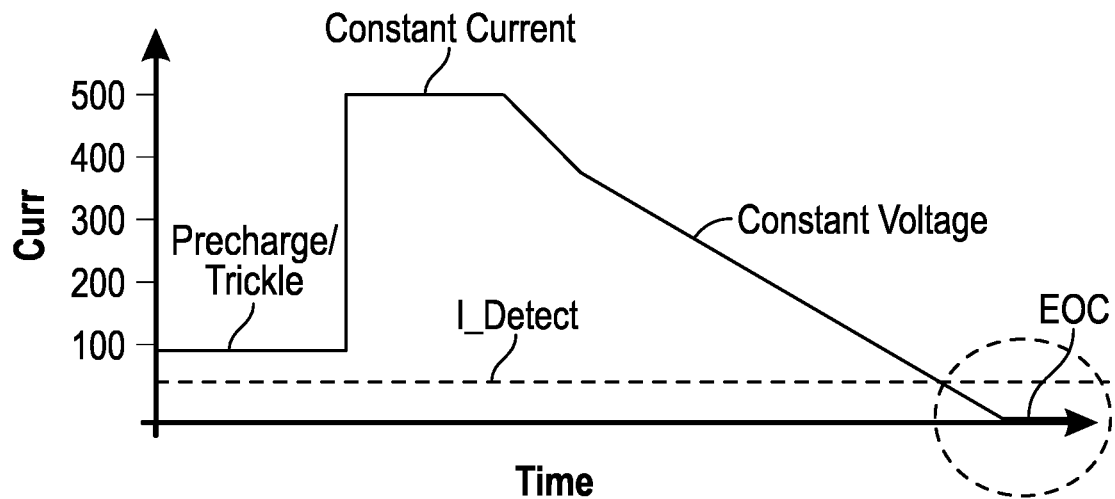
FIG. 5 is a graph or profile of an example current draw by the chargeable device in several states and a current detection threshold for indication of connection of the cable and the device via the cable ahead and cable plug.

The battery charger circuitry 63, or control of that circuitry 63 by the MCU 67, configures the device circuitry 17 to implement a regulated current profile for charging of the battery 61 over an interval of time. FIG. 5 is a graph or profile of an example current draw by the example chargeable device 11 of FIGS. 1 and 4 for battery charging. The current levels at the various stages of the profile are given by way of example only. The device 11 may implement different levels or a profile with different stages, for example to address the charging requirements of the particular type of battery 61 utilized in the particular chargeable device 11. With reference to the example of FIG. 5, when the device 11 is coupled to a charging path through the cable plug 19, the regulated current flow implements several states of the profile of FIG. 5. In an initial state, the battery charging circuitry 63 draws approximately 100 milliamps for pre-charge or trickle charge current. At a later time, e.g., when certain conditions of MCU operation or of the battery charge are met, the battery charging circuitry 63 draws approximately 500 milliamps constant charging current, for rapid full-power charging of the battery 61. At a later time, e.g., when the battery reaches a particular threshold for percentage of charge, the battery charging circuitry 63 draws current to apply a constant voltage to the battery. In this third state, while the voltage remains constant, the current flow ramps down until the battery is fully charged, and the device 11 reaches an end of charging (EOC) state at a minimal current level.

As noted, various techniques (e.g., proximity sensing) may be used to detect presence of the plug inserted in the cable head, or various techniques may be used to detect connection for charging current flow via the pins of the cable head and the contact pads of the cable plug. The examples discussed below utilize sensing of current through the charging circuit formed by the pins of the cable head and the contact pads of the cable plug. FIG. 5 also shows a current detection threshold value (I_detect) for use in control of the path switching responsive to the current sensing. As discussed later, the charging cable circuitry 31 (FIG. 1) detects the current on the connected path through the cable head and cable plug. Sensing current flow on the connected path at or above the I_detect threshold value serves as an indication of connection of the cable 15 and the chargeable device 11 via the cable ahead 33 and the cable plug 19. Although other threshold values may be used, the example shows a current detection threshold value (I_detect) of about 60 milliamps.

With the example profile and I_detect value shown in FIG. 5, the current drawn through the charging path through the cable head and the cable plug exceed the I_detect threshold value in the precharge or trickle state, the constant current state and most of the constant voltage state.

As the battery nears full charge late in the constant voltage state, the current drawn through the charging path through the cable head and the cable plug drops below the I_detect value that the cable uses for connection detection. Also, the current draw in the end of charging (EOC) state is below the I_detect value that the cable uses for connection detection. The example device circuitry 11 of FIG. 4 introduces pulse modulation to mitigate potential failures of the cable circuitry to detect connection in these later situations in the charging current profile of FIG. 5.

When the battery is finished charging, in the EOC state of the illustrated profile, it may still be desirable to sense current as an indication to the cable circuitry that the chargeable device is still electrically connected. A variety of techniques may be used to facilitate such detection. For example, the chargeable device may be configured to draw a low level current flow sufficient to trip the I_detect threshold. Any current flow could work if a current sensor with a threshold that is sufficiently low enough is used. For example, the idle system current draw of the chargeable device could be enough by itself to trip the threshold depending on the type or configuration or the application of the chargeable device.

Figure 6:
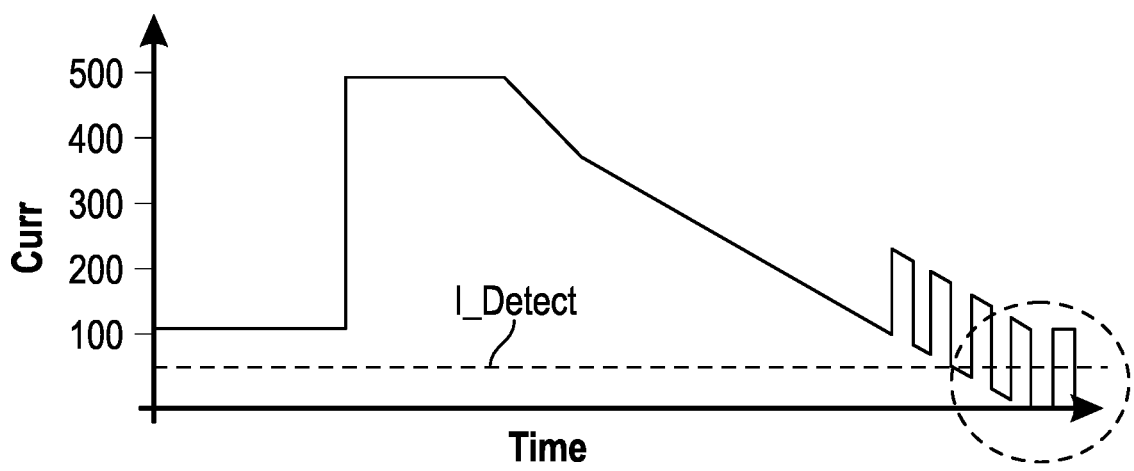
FIG. 6 is a graph or profile of an example current draw by the chargeable device similar to FIG. 5 but also showing modulation of the current.

To allow for a lower power consumption in a low current state, an example system discussed below adds pulse modulation to the current draw. Where the current drawn by the chargeable device might otherwise fall below the I_detect threshold, the periodic peaks of the modulated current meet or exceed the I_detect threshold. FIG. 6 is a graph or profile of an example current draw by the chargeable device similar to FIG. 5 but also showing such pulse modulation of the current.

As outlined earlier relative to FIG. 4, the MCU 67 operates the switch 65 to pulse modulate current through the cable plug 19. The current profile of FIG. 6 shows modulation pulses superimposed on the current flow, by opening and closing of the switch 65, at least in the state(s) in which the level of current flow would otherwise fall below the I_detect threshold level. The peaks of the pulses of the modulated current rise to a level at or above the I_detect threshold level. Based on appropriate timing by the cable circuitry 31, the cable 15 is able to sense the peaks of the current pulses periodically exceeding the I_detect threshold level as an indication of contact of currently connected pins of the cable head 33 with the power and ground contact pads of the cable plug 19 sufficient to establish a charge path with the battery charger circuitry 63 of the chargeable device 11.

Figure 7:
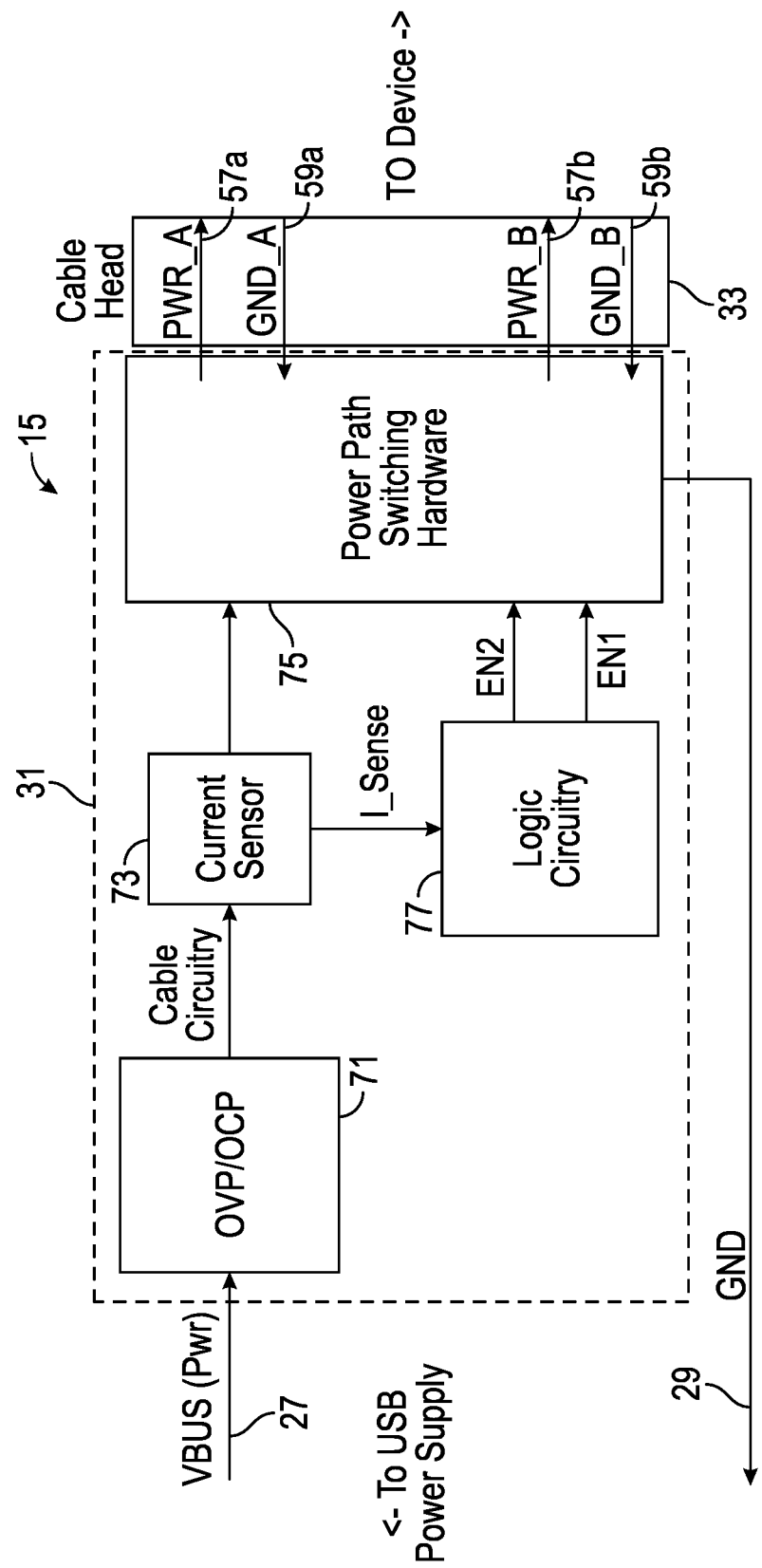
FIG. 7 is a functional block diagram of an example of the charging cable.

FIG. 7 is a functional block diagram of an example of the charging cable 15. The wiring going to the USB type power supply (see FIG. 1) includes a power bus 27 shown as the VBUS in FIG. 7, for a USB compatible cable. The wiring going to the USB type power supply also includes a ground bus 29.

The cable circuitry 31 in this example includes a protection circuit 71 that provides either one or both of over-voltage protection (OVP) or over-current protection (OCP). Power from the protection circuit 71 flows through a current sensor 73 to power path switching hardware 75. The example shown in FIGS. 7 and 8 includes two pairs of power and ground pins, shown as one pair including power pin 57a and ground pin 59a and another pair including power pin 57a and ground pin 59a.

The power path switching hardware 75 of FIG. 7 includes one or more power path switches selectively coupled between the pins and the buses (through the sensor 73 and the protection circuit 71). In the more specific example of FIG. 8 the power path switching hardware 75 is shown in two sections 77p, 77g that together include four switches 81-84, one for each of the pins of the cable head. Any switching device configured to switch a suitable amount of current, such as any of a variety of switching transistors, may be used for each of the switches 81-84. The drawing, for example, shows a field effect transistor (FET) as each of the switches 81-84.

Power path switching hardware section 77p connects to the power bus 27 and includes switches 81 and 83 connected to the power pins 57a, 57b respectively. Power path switching hardware section 77g connects to the ground bus 29 and includes switches 82 and 84 connected to the power pins 57a, 57b respectively. Selective operations of the switches 81, 82 connect and disconnect the pins 57a, 59a of the first pair to and from the power bus 27 and the ground bus 29; and selective operations of the switches 83, 84 connect and disconnect the pins 57b, 59b of the second pair to and from the power bus 27 and the ground bus 29. The pins 57a, 57b form a first pair, for purposes of contacting pads of the cable plug; and the pins 57b, 57b form a first pair, for purposes of contacting pads of the cable plug In the relative rotational positions shown, the power pin 57a contact power pad 85 and ground pin 59a contact ground pad 87; and in those positions, the first pair of pins 57a, 59a and pads 85, 87 form a charging path of the proper current flow polarity. The pair of pins 57b, 59b contact the pads but in the reverse polarity, with power pin 57a contacting the ground pad 87 and the ground pin 59b contacting the power pad. When the switches 81, 82 connect the pins 57a, 59a to the buses, the connections establish the charging path for current flow through the cable head and the cable plug. In that switch state the switches 83, 84 disconnect the pins 57b, 59b disabling the inverse polarity configuration.

FIG. 8 also shows the alternate implementation of the cable plug 19a of the chargeable device inserted into the cable head and in contact the various pins 57a, 57b, 57a, 57b of the cable head. In that illustrated example, the cable plug 19a includes two appropriately contoured metal pieces that form large sections of the plug and serve as the power contact pad 85 and the ground contact pad 89. The drawing cable plug 19a has an electrically insulating separator between the metal pieces completes the cylinder of the plug, and the insulating separator forms a deadzone 89 with respect to current flow between the pins of the cable head and the pads of the cable plug 19a.

The cable circuitry 31 in this example includes logic circuitry 77 (FIG. 7). The logic circuitry may be implemented using another MCU similar to the MCU used as the charging controller in the example of the chargeable device. A specific example of the logic circuitry discussed later with respect to FIG. 9 instead uses specific logic components, for example, in view of size and cost constraints applicable to the charging cable 15.

The switching logic circuitry 77 receives a signal (I-SENSE) from the current sensor 73, and that signal has a voltage indicative of the instantaneous magnitude of the sensed current flowing through the sensor and thus through the power path switching hardware 75 and the cable head 33. In this example, the switching logic circuitry 77 responds to the detected current indicated by the signal (I-SENSE) from the current sensor 73 and outputs selection signals EN1 and EN2 to the power path switching hardware 75. In one state, the selection signals cause the one or more switches of the power path switching hardware 75 to selectively connect the first pair of pins 57*a*, 59*a* to the power and ground buses; and in the other state, the selection signals cause the one or more switches of the power path switching hardware 75 to selectively connect the second pair of pins 57*a*, 59*a* to the power and ground buses.

In the examples of FIGS. 7 and 8, the EN1 and EN2 control signals have inverse states, one is high when the other is low and vice versa. The switches 81-84 use two different types of FETs to inversely respond to the states on their respective inputs. FET switches 81 and 83, for example, may close in response to a high input and open in response to a low input. In such an example, the FET switches 82 and 84 may close in response to a low input and open in response to a high input. The FET switches 81 an3 open and close in response to states of the EN2 control signal.

In such an arrangement, a high value on EN1 closes switch 81 to connect power pin 57*a* to the power bus 27 and opens switch 84 to disconnect ground pin 59*a* from the ground bus 29. At the same time, the inverse low value of EN2 opens the switch 83 to disconnect the power pin 57*b* from the power bus 27 and closes switch 82 to connect the ground pin 59*a* to the ground bus 29. In that state, the pair of pins 57*a*, 59*a* are connected to the buses 27, 29, and the pair of pins 57*b*, 59*b* are disconnected. In the alternative state of the EN1, EN2 signals, a low value on EN1 opens switch 81 to disconnect power pin 57*a* from the power bus 27 and closes the switch 84 to connect ground pin 59*a* to the ground bus 29. At the same time, the inverse high value of EN2 closes the switch 83 to connect the power pin 57*b* to the power bus 27 and opens switch 82 to disconnect the ground pin 59*a* from the ground bus 29. In that state, the pair of pins 57*b*, 59*b* are connected to the buses 27, 29, and the pair of pins 57*a*, 59*a* are disconnected.

In each state, the power path switching hardware 75 connects a respective one (57*a* or 57*b*) of the power pins to the power bus 27 and a respective one (59*a* or 59*b*) of the ground pins to the ground bus 25. The two charging paths and the switching thereof in this example are complimentary in that only one pair of power and ground pins are connected to the power and ground buses so as to allow current flow in each state. At a high level, the switching logic circuitry 77 is configured to maintain connection via the power and ground pins of a selected pair (to the power bus and the ground bus respectively) so as to provide a charging path for current flow through the cable head and the cable plug of the chargeable device, in response to detection of current flow (I_SENSE) via the selected pair of power and ground pins by the current sensor.

In an example, the switching logic circuitry 77 is configured to operate the power path switches 81-84 to alternatively connect respective pairs of power and ground pins to the power and ground buses while current detection by the current sensor is below the threshold value I_detect. Stated another way, the switching logic circuitry 77 considers a condition in which the detected current flow value I_SENSE is below the threshold value I_detect as an indication that a viable charging current flow path has not been established. It may be that the cable plug is not yet inserted into the socket of the cable head, that the toggling has connected a pair of pins to the buses that currently rest on the exposed regions of the insulating separator forming the deadzone 89, or that the toggling has connected a pair of pins to the buses that currently contact the pads but in the reverse polarity order (power pin-to-ground pad and ground pin-to-power pad).

In an example, the switching logic circuitry 77 is further configured to establish a charging path by maintaining, without further alternative connections, the connections via a selected power pin to the power bus and a selected ground pin to the ground bus. The switching logic circuitry 77 stops the toggling and maintains the connections for the charging path in response to detection of current at or above the threshold value through a pair of pins that includes the one power pin and the one ground pin. The condition in which the detected current flow value I_SENSE is at or above the threshold value I_detect indicates that the cable plug is inserted into the socket of the cable head, that the toggling has connected a pair of pins to the buses that currently rest on both contact pads of the cable plug, and that the toggling has connected a pair of pins to the buses that currently contact the pads in the appropriate polarity order for direct current charging flow (power pin-to-power pad and ground pin-to-ground pad).

Figure 9:
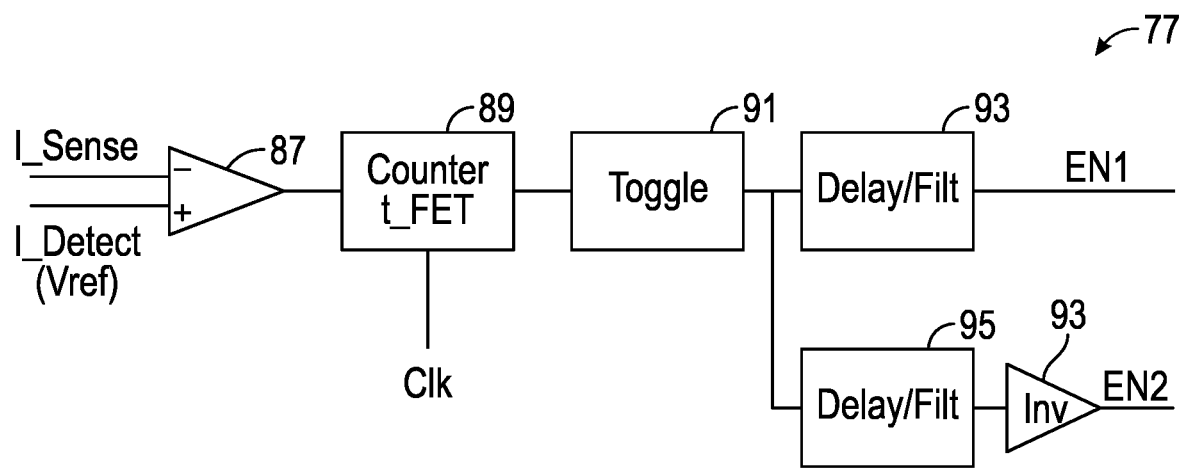
FIG. 9 is a logic diagram of an example of switching logic circuitry that may be utilized in the charging cable of FIG. 7.

FIG. 9 illustrates an example of an arrangement of logic circuits for implementing the current responsive toggling and switching of pin connection current detection implemented by the charging path connection logic as outlined above. The example switching logic circuitry 77 includes a comparator 87. The voltage I_SENSE from the current sensor that is proportional to the sensed current is coupled to the negative input of the comparator 87. A voltage reference I_DETECT corresponding to the appropriate value for the I-detect current threshold value is coupled to the positive input of the comparator 87. With the connections to the positive and negative inputs shown by way of example in the drawing, the comparator 87 provides a relatively high output voltage when the voltage I_SENSE is below (less than) the reference voltage I_DETECT, and the comparator 87 provides a relatively high output voltage when the voltage I_SENSE is at or above (greater than or equal to) the reference voltage I_DETECT.

The example switching logic circuitry 77 includes a counter 89 that is responsive to the output from the comparator 87 and a clock (Clk). The counter 89 will output a pulse periodically (every time the count of clock pulses reaches a count value corresponding to a time interval t_FET) while the input, from the comparator 87 to the counter 89 is high (in this case while the current indicated by voltage I_SENSE is below the reference voltage I_DETECT corresponding to the current threshold, which indicates that there is no viable current charging path connected through the currently connected pair of power and ground pins of the cable head.

The example switching logic circuit 77 includes a toggle circuit 91 configured to toggle between high and low output states in response to periodic detections of a rising edge of a periodic pulse output from the counter 89. Hence, the toggle circuit 91 output toggles back and forth between high and low output states in response to rising edges of successive periodic pulses from the output of the counter 89, while the current indicated by voltage I_SENSE is below the reference voltage I_DETECT corresponding to the current threshold which indicates that there is no viable current charging path connected through the currently connected pair of power and ground pins of the cable head.

The example switching logic circuit 77 further includes a delay and filter circuit 93 responsive to the state of the toggle circuit 91. The delay and filter circuit 93 outputs the EN1 control signal to the power path switches 81 and 84 shown in FIG. 8. As a result of the delay function, each transition of going high or going low of the EN1 control signal to change the sates of the power path switches 81 and 84 follows the corresponding high or low transition of the output of the toggle circuitry 91 by a predefined delay interval. The filter function serves to clean up any transients from the EN1 signal.

When EN1 is high, EN2 is low; and when EN1 is low, EN2 is high. As outlined earlier, in the state when EN1 is high and EN2 is low, the switches 81, 82 connect the pins 57a, 59a to the buses 27, 29 and the switches 83, 84 disconnect the pins 57b, 59b. Conversely, when EN1 is low, EN2 is high, the switches 81, 82 connect the pins 57a, 59a and the switches 83, 84 connect the pins 57b, 59b to the buses 27, 29.

The toggling between states repeats continually as long as the I_SENSE voltage is below the reference voltage I_DETECT indicating that the current flow to the chargeable device is below the I_detect current value for periods longer that the interval t_FET of the counter 89. First one pair of pins is connected to the power and ground buses, then the other pair of pins is connected to the power and ground buses, and so on.

In the illustrated example arrangement of the switching logic circuit 77, the output of the comparator 87 goes low when the voltage I_SENSE reaches the reference voltage I_DETECT and stays low as long as the voltage I_SENSE remains at or above the reference voltage I_DETECT. During such a time, the counter 89 stops counting and does not output any new pulses to the toggle circuit 91. The toggle circuit stops toggling and remains in its last output state (high of low).

More specifically, the delays in the transitions of the EN1 and EN2 switch control signals keeps the switches 81-84 in each state for some period of time to allow for a transition of the current flow as the charging circuitry begins to draw charging current. As current begins to flow, e.g., in the pre-charge or trickle charge state, the current meets or exceeds the I_detect current threshold value. The sensor output voltage I_SENSE will then exceed the voltage reference I_DETECT value corresponding to the current threshold. When the comparator 87 changes state, its output goes low, which stops the counter. In response, the toggle circuit 91 stops toggling and retains its last high or low state that resulted in the successful current detection. For example, if the toggle output was high, the toggle circuit 91 continues to output a high voltage, EN1 stays high, and EN2 stays low. The switches maintain connection of the pins 57a, 59a to the buses, and the switches keep the pins 57b, 59b. Charging current flows through the path including the pins 57a, 59a and the contact pads of the cable plug. If the toggle output was low, the toggle circuit 91 continues to output a low voltage, EN1 stays low, and EN2 stays high. The switches maintain connection of the pins 57b, 59b to the buses, and the switches keep the pins 57a, 59a disconnected. Charging current flows through the path including the pins 57b, 59b and the contact pads of the cable plug.

Figure 10:
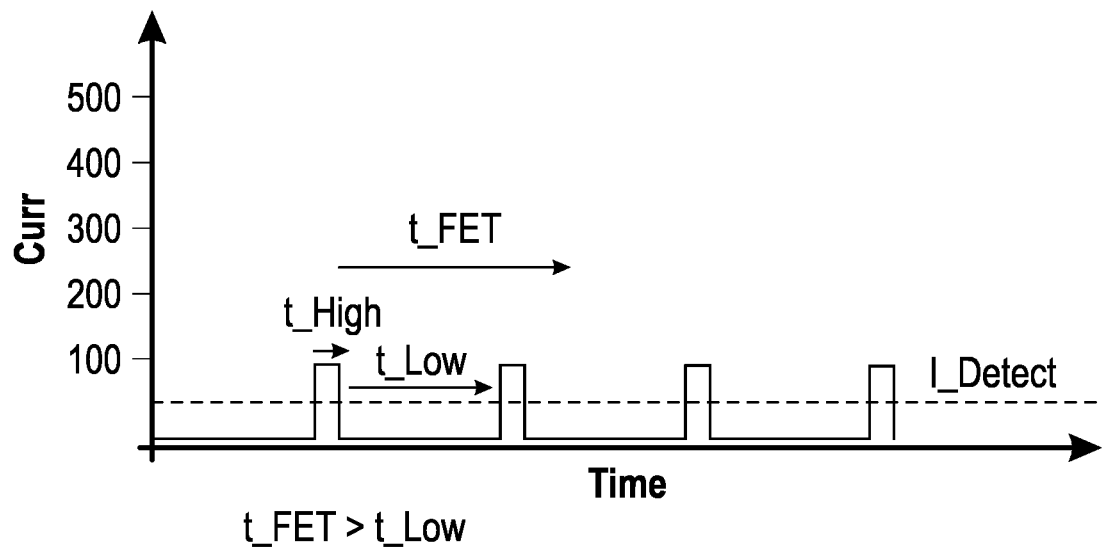
FIGS. 10, 11, 12, and 13 are graphs of examples of sensed current over time, in several different system states.

FIGS. 10 to 13 show examples of sensed current over time, in several different states of a system like system 11 of FIG. 1. FIG. 10 shows pulses of the current flow, including the current modulation pulses from the chargeable device, when the battery charger has reached the end of charging (EOC) low current state (see also FIG. 6). The device circuitry (FIG. 4) is configured to generate the modulation pulses of sufficient magnitude so that the current is above the I_detect threshold, therefore the peaks of the I_SENSE output voltage exceeds the I_DETECT reference voltage used by the comparator 87, causing periodic low outputs from the comparator to the input of the counter when the cable circuitry senses the peak current levels above I_detect of the modulation pulses. Each low detection pulse from the comparator 87 resets the counter 89. The time interval when a modulation pulse is high is referred to as t_high, and the period when a modulation pulse is low is referred to as t_low. The time period (t_FET) of the counter 89 to periodically issue a pulse is greater than the length of time (t_low) for current modulation to stay low, so that the counter 89 does not output any pulse to activate the toggle circuit 91 if a pulse is detected again before expiration of t_FET, as an indication that the cable head 33 and the cable plug 19 are still coupled together and the currently connected pair of pins provide a charging path of the appropriate polarity via the plug contact pads.

Figure 11:
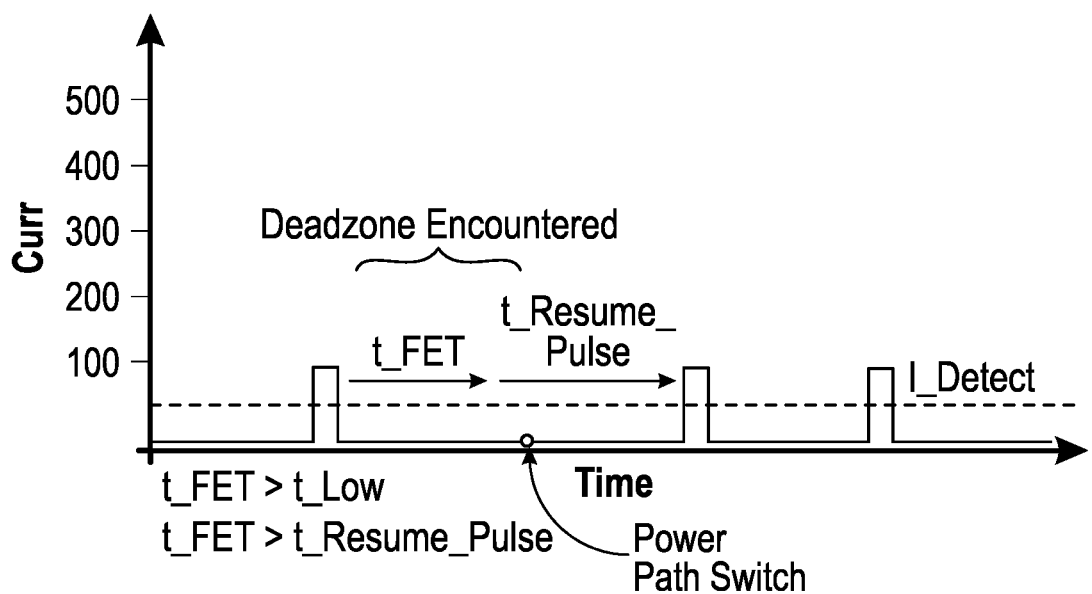

FIG. 11 is similar to FIG. 10 except that the initially connected pin pair lands on a deadzone disabling the connected current path. Hence, at some point after detection of a pulse, voltage from the comparator remains high for a longer period and the time period t_FET of the counter 87 expires. A pulse resulting from timeout of the counter 89 activates the toggle circuit 91, which results in a toggling of the various switches to switch-over to the other current path via the other pair of pins. With the newly connected alternate pin pair properly connected to the pads of the cable plug, current can flow to the battery charger circuitry 63. The MCU causes the chargeable device circuitry to resume periodic activation of the switch 65 to pulse modulate the current flow, starting after an interval t_resume_pulse following the switch-over to the alternate current path. Current flow during the interval t_resume_pulse provides sufficient current to at least activate the MCU to resume pulsing. Now in the alternate state, the circuitry 31 of the charging cable 15 detects subsequent modulation pulses as in the example of FIG. 10. In the example, the time interval t_FET of the counter is greater than the time interval t_resume_pulse for the chargeable device to resume pulse modulation (t_FET>t_resume_pulse).

Figure 12:
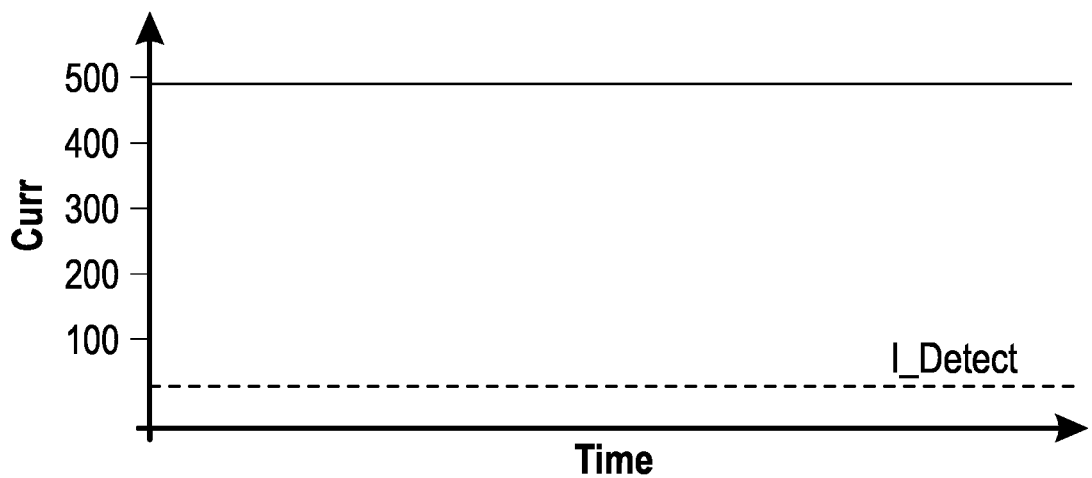

As shown in FIG. 12, in the normal charging state, the current continuously exceeds the current detection threshold I_detect. In this state, the charging current itself is sufficient for the sensing by comparator of the cable circuitry. Voltage from the comparator remains high, the counter does not count clock pulses, there is no pulse to trigger the toggle circuit, and the logic and path switching hardware maintains the connections of the pins of the cable head that provided the charging path of the appropriate polarity for the flow of charging current to the battery charger circuitry.

Figures 13, 14:
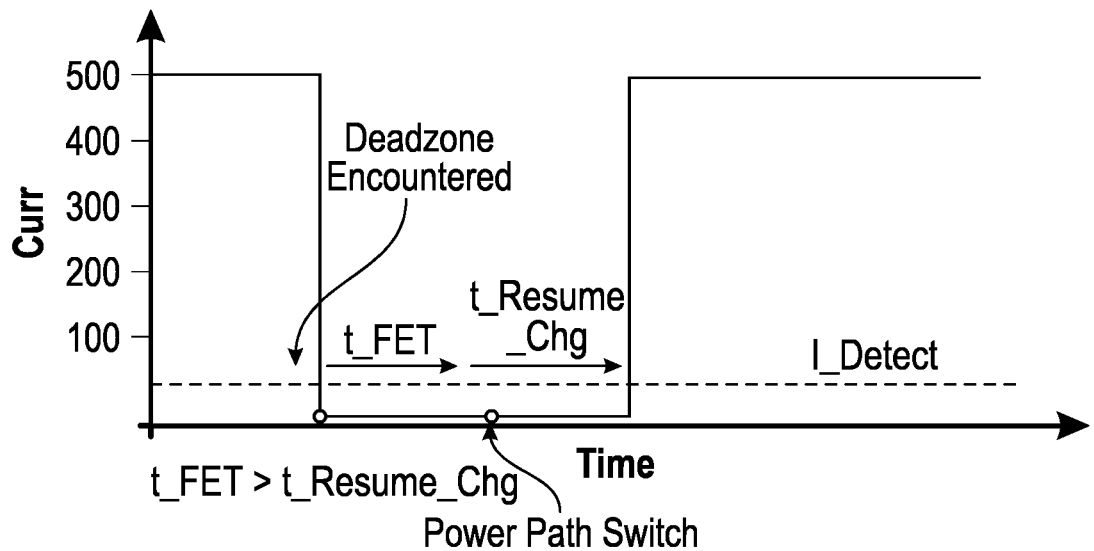
FIG. 14 shows a number of examples of timing conditions.

FIG. 13 shows a change of state, for example, if the user rotates the charging cable head coupled to the cable plug. When the pair of connected pins land on the deadzone, the current flow drops below the threshold value I_detect for charging current detection. Voltage from the comparator remains high for a longer period following the path interruption time, and the time period t_FET of the counter 89 expires. A pulse resulting from timeout of the counter 89 activates the toggle circuit 91, which results in a toggling of the various switches to switch-over to the other current path via the other set of pins. With the newly connected alternate pin pair properly connected to the pads of the cable plug, current can flow to the battery charger circuitry 63. The MCU causes the chargeable device circuitry to resume periodic activation of the switch 65 to pulse modulate the current flow, starting after an interval t_resume_pulse following the switch-over to the alternate current path. Current flow during the interval t_resume_pulse provides sufficient current to at least activate the MCU to resume pulsing. Now in the alternate state, the circuitry 31 of the charging cable 15 detects subsequent modulation pulses as in the example of FIG. 10. In the example, the time interval t_FET of the counter is greater than the time interval t_resume_pulse for the chargeable device to resume pulse modulation (t_FET>t_resume_pulse).

FIG. 14 summarizes the examples of the timing conditions relative to the time interval t_FET of the counter.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like, whether or not qualified by a term of degree (e.g., approximate, substantially, or about), may vary by as much as ±10% from the recited amount.

Although an overview of the inventive subject matter has been described with reference to specific examples, various modifications and changes may be made to these examples without departing from the broader scope of examples of the present disclosure. Such examples of the inventive subject matter may be referred to herein, individually, or collectively, by the term "invention" merely for convenience and without intending to voluntarily limit the scope of this application to any single disclosure or inventive concept if more than one is, in fact, disclosed.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

What is claimed is:

1. A system, comprising:
    a chargeable device including:
        a battery;
        a battery charger circuit coupled to the battery; and
        a cylindrical post having a curved surface including first and second charging contact pads coupled to supply power to the battery charger circuit of the chargeable device, and an insulator electrically separating the first and second charging contact pads; and
    a charging cable including:
        a power bus and a ground bus;
        a cable head having a cylindrical recess configured to accept the cylindrical post when the cable head is rotatably coupled to the cylindrical post of the chargeable device;
        power pins and ground pins protruding into the cylindrical recess of the cable head; and
        one or more power path switches coupled between the pins and the buses to selectively connect a different one of the power pins to the power bus and a different one of the ground pins to the ground bus;
        wherein the power pins include a first power pin and a second power in and the ground pins include a first ground pin and a second ground pin, the first power in protrudes into the cylindrical recess at a position opposite the first ground pin, and the second power pin protrudes into the cylindrical recess at a position opposite the first ground pin.

2. The system of claim 1, wherein the first power pin, the second power pin, the first ground pin, and the second ground pin are located at four equidistant locations around a cylindrical inner wall of the cylindrical recess.

3. A system, comprising
    a chargeable device including:
        a battery;
        a battery charger circuit coupled to the battery; and
        a cylindrical post having a curved surface including first and second charging contact pads coupled to supply power to the battery charger circuit of the chargeable device, and an insulator electrically separating the first and second charging contact pads; and
    a charging cable including:
        a power bus and a ground bus;
        a cable head having a cylindrical recess configured to accept the cylindrical post when the cable head is rotatably coupled to the cylindrical post of the chargeable device;
        power pins and ground pins protruding into the cylindrical recess of the cable head; and
        one or more power path switches coupled between the pins and the buses to selectively connect a different one of the power pins to the power bus and a different one of the ground pins to the ground bus,
        wherein the cylindrical post includes a plastic post forming the insulator, a first metallic pad positioned in or on the plastic post forming the first charging contact pad, and a second metallic pad positioned in or on the plastic post forming the second charging contact pad.

4. The system of claim 3, wherein the first metallic pad is mounted in or on a first side of a cylindrical lateral surface of the plastic post and the second metallic pad is mounted in or on a second side of the cylindrical lateral surface of the plastic post opposite the first side.

5. The system of claim 4, wherein the insulator creates a first gap and a second gap between the first metallic pad and the second metallic on the cylindrical lateral surface and wherein the width of the first and the second gap are greater than a contact area of a power or ground pin on the cylindrical lateral surface when the cable head having the cylindrical recess receives the cylindrical post.

6. A system, comprising:
a chargeable device including:
  a battery;
  a battery charger circuit coupled to the battery; and
  a cylindrical post having a curved surface including first and second charging contact pads coupled to supply power to the battery charger circuit of the chargeable device, and an insulator electrically separating the first and second charging contact pads; and
a charging cable including:
  a power bus and a ground bus;
  a cable head having a cylindrical recess configured to accept the cylindrical post when the cable head is rotatably coupled to the cylindrical post of the chargeable device;
  power pins and ground pins protruding into the cylindrical recess of the cable head; and
  one or more power path switches coupled between the pins and the buses to selectively connect a different one of the power pins to the power bus and a different one of the ground pins to the ground bus, wherein the cylindrical post includes a first metal piece forming the first charging contact pad, a second metal piece forming the second charging contact pad, and an electrically insulating separator positioned between the first and second metal pieces forming the insulator.

7. The system of claim 1, wherein the cable head has a cylindrical outer perimeter and wherein the chargeable device further comprises:
a cylindrical device recess larger than the cylindrical outer perimeter.

8. The system of claim 1, further comprising:
a current sensor coupled to at least one of the buses to detect current via selected pairs of the pins of the cable head when connected to the buses by the one or more power path switches.

9. A charging cable including:
a power bus and a ground bus;
a cable head having a cylindrical recess configured to accept a cylindrical post of a chargeable device when the cable head is rotatably coupled to the cylindrical post of the chargeable device;
power pins and ground pins protruding into the cylindrical recess of the cable head; and
one or more power path switches coupled between the pins and the buses to selectively connect a different one of the power pins to the power bus and a different one of the ground pins to the ground bus;
wherein the power pins include a first power pin and a second power pin and the ground pins include a first ground pin and a second ground pin, the first power pin protrudes into the cylindrical recess at a position opposite the first ground pin, and the second power pin protrudes into the cylindrical recess at a position opposite the first ground pin.

10. The charging cable of claim 9, wherein the first power pin, the second power pin, the first ground pin, and the second ground pin are located at four equidistant locations around a cylindrical inner wall of the cylindrical recess.

11. The charging cable of claim 9, wherein the cable head has a cylindrical outer perimeter.

12. The charging cable of claim 9, further comprising:
a current sensor coupled to at least one of the buses to detect current via selected pairs of the pins of the cable head when connected to the buses by the one or more power path switches.

13. A chargeable device including:
a battery;
a battery charger circuit coupled to the battery; and
a cylindrical post having a curved surface including first and second charging contact pads coupled to supply power to the battery charger circuit of the chargeable device, and an insulator electrically separating the first and second charging contact pads;
wherein the cylindrical post includes a plastic post forming the insulator, a first metallic pad positioned in or on the plastic post forming the first charging contact pad, and a second metallic pad positioned in or on the plastic post forming the second charging contact pad.

14. The chargeable device of claim 13, wherein the first metallic pad is mounted in or on a first side of a cylindrical lateral surface of the plastic post and the second metallic pad is mounted in or on a second side of the cylindrical lateral surface of the plastic post opposite the first side.

15. The chargeable device of claim 14, wherein the insulator creates a first gap and a second gap between the first metallic pad and the second metallic pad on the cylindrical lateral surface and wherein the width of the first and the second gap are greater than a contact area of a power or ground pin of a cable head having a cylindrical recess on the cylindrical lateral surface when the cable head having the cylindrical recess receives the cylindrical post.

16. A chargeable device including;
a battery;
a battery charger circuit coupled to the battery; and
a cylindrical post having a curved surface including first and second charging contact pads coupled to supply power to the battery charger circuit of the chargeable device, and an insulator electrically separating the first and second charging pads, wherein the cylindrical post includes a first metal piece forming the first charging contact pad, a second metal piece forming the second charging contact pad, and an electrically insulating separator positioned between the first and second metal pieces forming the insulator.

17. The chargeable device of claim 13, wherein a cable head of a charging cable has a cylindrical outer perimeter and wherein the chargeable device further comprises:
a cylindrical device recess larger than the cylindrical outer perimeter configured to receive the cable head of the charging cable.

* * * * *